United States Patent
Suzuki et al.

(10) Patent No.: US 11,796,343 B2
(45) Date of Patent: Oct. 24, 2023

(54) MAP MAINTENANCE SYSTEM AND MAP MAINTENANCE METHOD

(71) Applicant: Mitsubishi Electric Corporation, Chiyoda-ku (JP)

(72) Inventors: Toshiharu Suzuki, Chiyoda-ku (JP); Yasunari Goto, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 648 days.

(21) Appl. No.: 16/760,988

(22) PCT Filed: Nov. 27, 2018

(86) PCT No.: PCT/JP2018/043489
§ 371 (c)(1),
(2) Date: May 1, 2020

(87) PCT Pub. No.: WO2019/103150
PCT Pub. Date: May 31, 2019

(65) Prior Publication Data
US 2021/0172760 A1    Jun. 10, 2021

(30) Foreign Application Priority Data

Nov. 27, 2017   (JP) .................. 2017-226473

(51) Int. Cl.
*G01C 21/00* (2006.01)
*G06T 7/521* (2017.01)
(Continued)

(52) U.S. Cl.
CPC ..... *G01C 21/3859* (2020.08); *G01C 21/3848* (2020.08); *G01S 17/89* (2013.01);
(Continued)

(58) Field of Classification Search
CPC . G01C 21/3848; G01C 21/3859; G01S 17/89; G06Q 10/101; G06Q 10/20;
(Continued)

(56) References Cited

U.S. PATENT DOCUMENTS

| | | |
|---|---|---|
| 2005/0049900 A1 | 3/2005 | Hirose et al. |
| 2007/0195094 A1 | 8/2007 | Adachi |

(Continued)

FOREIGN PATENT DOCUMENTS

| | | | |
|---|---|---|---|
| AU | 2015 395 741 A1 | 11/2017 | |
| EP | 3 220 370 A1 | 9/2017 | |

(Continued)

OTHER PUBLICATIONS

Japanese Office Action dated Mar. 23, 2021 in Japanese Patent Application No. 2019-555401 (with English abstract), 6 pages.
(Continued)

*Primary Examiner* — Babar Sarwar
(74) *Attorney, Agent, or Firm* — Oblon, McClelland, Maier & Neustadt, L.L.P.

(57) ABSTRACT

A cooperating vehicle (110) is a transporting vehicle which includes sensors for road measurement. An in-vehicle apparatus (300) mounted on the cooperating vehicle acquires measured data obtained by the cooperating vehicle, generates point cloud data on the basis of the measured data, and transmits the point cloud data to a map server apparatus (200). The map server apparatus receives the point cloud data from the in-vehicle apparatus, and generates map data on the basis of the point cloud data.

15 Claims, 18 Drawing Sheets

(51) Int. Cl.
  *G01S 17/89* (2020.01)
  *G06Q 10/20* (2023.01)
  *G06Q 20/08* (2012.01)
  *G06Q 50/26* (2012.01)
  *G07C 5/00* (2006.01)

(52) U.S. Cl.
  CPC .......... *G06Q 10/20* (2013.01); *G06Q 20/085* (2013.01); *G06Q 50/26* (2013.01); *G06T 7/521* (2017.01); *G07C 5/008* (2013.01); *G06T 2207/10028* (2013.01); *G06T 2207/30252* (2013.01)

(58) Field of Classification Search
  CPC ...... G06Q 20/085; G06Q 50/10; G06Q 50/26; G06T 2207/10028; G06T 2207/30252; G06T 7/521; G07C 5/008; G09B 29/004
  See application file for complete search history.

(56) References Cited

U.S. PATENT DOCUMENTS

| | | | |
|---|---|---|---|
| 2011/0160987 A1 | 6/2011 | Wu et al. | |
| 2016/0171884 A1 | 6/2016 | Chen et al. | |
| 2017/0220039 A1* | 8/2017 | Funakawa | B60W 60/0053 |
| 2017/0225567 A1* | 8/2017 | Tsuda | G08G 1/096741 |
| 2018/0373910 A1 | 12/2018 | Sato et al. | |
| 2019/0025071 A1 | 1/2019 | Fukui | |
| 2019/0043274 A1 | 2/2019 | Hayakawa et al. | |
| 2019/0111784 A1 | 4/2019 | Tsuda | |
| 2019/0392708 A1 | 12/2019 | Tsuda et al. | |
| 2021/0215491 A1* | 7/2021 | Liu | H04W 4/40 |
| 2021/0334865 A1* | 10/2021 | Irey | G06Q 30/0283 |

FOREIGN PATENT DOCUMENTS

| | | | |
|---|---|---|---|
| EP | 3 299 763 A1 | 3/2018 | |
| JP | 2002-251398 A | 9/2002 | |
| JP | 2003-279358 A | 10/2003 | |
| JP | 2005-78124 A | 3/2005 | |
| JP | 2007-206099 A | 8/2007 | |
| JP | 2009-222572 A | 10/2009 | |
| JP | 2010-128042 A | 6/2010 | |
| JP | 2011-138486 A | 7/2011 | |
| JP | 2014-52341 A | 3/2014 | |
| JP | 2014-228637 A | 12/2014 | |
| JP | 2016-200472 A | 12/2016 | |
| JP | 2017-26386 A | 2/2017 | |
| JP | 2017-33064 A | 2/2017 | |
| JP | 2017-151798 A | 8/2017 | |
| JP | 2017-181870 A | 10/2017 | |
| WO | WO 2005/088584 A1 | 9/2005 | |
| WO | WO 2014/097445 A1 | 6/2014 | |
| WO | WO 2016/068273 A1 | 5/2016 | |
| WO | WO 2016/185637 A1 | 11/2016 | |
| WO | WO 2017/110801 A1 | 6/2017 | |
| WO | WO-2017142536 A1 * | 8/2017 | G01C 21/3438 |
| WO | WO 2017/150059 A1 | 9/2017 | |

OTHER PUBLICATIONS

Japanese Office Action dated Aug. 3, 2021 in Japanese Patent Application No. 2019-555401 (with English translation), 4 pages.
Extended European Search Report dated Jan. 13, 2021 in European Patent Application No. 18880281.3, 9 pages.
Anonymous, "UC-win/Road Point Cloud data" XP055465811, http://www.forum8.com.ip/english/us-win/road-tengun-e.htm, Sep. 21, 2010, 7 pages.
Japanese Office Action dated Oct. 18, 2022 in Japanese Patent Application No. 2021-147396 (with unedited computer-generated English translation), 5 pages.
International Search Report dated Feb. 19, 2019 in PCT/JP2018/043489 filed Nov. 27, 2018, 2 pages.
Japanese Office Action dated Jul. 5, 2022 in Japanese Patent Application No. 2021-147396 (with unedited computer generated English translation), 5 pages.

* cited by examiner

MAP MAINTENANCE SYSTEM AND MAP MAINTENANCE METHOD

TECHNICAL FIELD

The present invention relates to map maintenance.

BACKGROUND ART

Dynamic map development and maintenance intended for expressways has been carried out since the fiscal year 2015.

A dynamic map is a high-accuracy three-dimensional map including dynamic information, semi-dynamic information, semi-static information, and static information.

Static information of a dynamic map serves to identify a lane of a road with an accuracy of several centimeters to several tens of centimeters.

An automobile supporting a dynamic map is capable of autonomous driving.

Sensors such as a camera and a radar are mounted on the automobile. Pieces of information obtained by the sensors are compared with information (information on lanes, road features, and the like) obtained from a dynamic map. This allows recognition of an exact position of the automobile. As a result, performance of autonomous driving control is enhanced.

Patent Literature 1 illustrates a form of autonomous driving control using a dynamic map.

Development and maintenance of a dynamic map intended for general roads is needed to prepare for future widespread use of autonomous driving cars.

Patent Literature 2 illustrates a form of maintenance of a dynamic map.

In a mobile mapping system (MMS), a measuring vehicle collects pieces of three-dimensional point cloud information of roads, and pieces of linearized data of roads and features are obtained from the pieces of three-dimensional point cloud information. A dynamic map is generated on the basis of the obtained pieces of linearized data. The generated dynamic map is distributed to a map company and an automobile company.

To facilitate maintenance of a dynamic map, a measuring vehicle needs to run a long distance.

The invention according to Patent Literature 3 is intended to give notification that a guidepath has a portion where autonomous driving is impossible if there is no high-accuracy map data for a part of the guidepath.

The object of the invention according to Patent Literature 3 is to eliminate a sense of discomfort of a driver produced in a situation having a mix of areas with maintained high-accuracy map data and areas without maintained high-accuracy map data.

The above-described sense of discomfort is eliminated with further maintenance of a dynamic map intended for general roads.

Patent Literature 4 discloses a technique for increasing the efficiency of the work of partly updating data for map display.

To facilitate widespread use of a dynamic map, simplification of dynamic map updating work is necessary.

Patent Literature 5 discloses a method for achieving enhancement of the convenience for users in guidance information display at the time of path search. More specifically, guidance information which announces a region of interest together with the path is displayed. This allows a user to select an action during movement from a place of departure to a destination among various options, such as stopping in a region of interest not present on the path.

Enhancement of the convenience for users is also needed to maintain a dynamic map.

Patent Literature 6 discloses a method of displaying a point cloud image representing roads and surroundings of the roads on the basis of measured data obtained by a measuring vehicle.

CITATION LIST

Patent Literature

Patent Literature 1: WO 2017/150059
Patent Literature 2: WO 2017/110801
Patent Literature 3: JP 2016-200472
Patent Literature 4: WO 2005/088584
Patent Literature 5: JP 2009-222572
Patent Literature 6: WO 2016/185637

SUMMARY OF INVENTION

Technical Problem

The present invention has as its object to allow facilitation of maintenance of a dynamic map.

Solution to Problem

A map maintenance system according to the present invention includes
  a map server apparatus, and
  an in-vehicle apparatus mounted on a cooperating vehicle.
The map server apparatus includes
  a point cloud data acquisition unit to acquire point cloud data from the in-vehicle apparatus, and
  a map data generation unit to generate map data on the basis of the point cloud data.
The in-vehicle apparatus includes
  a measured data acquisition unit to acquire measured data obtained by the cooperating vehicle,
  a point cloud data generation unit to generate the point cloud data on the basis of the measured data, and
  a point cloud data provision unit to transmit the point cloud data to the map server apparatus.
The cooperating vehicle is a transporting vehicle which includes sensors for road measurement.

Advantageous Effects of Invention

According to the present invention, a cooperating vehicle is equipped with a sensor. Road measurement is performed by the cooperating vehicle. This facilitates maintenance of a dynamic map.

DESCRIPTION OF EMBODIMENTS

Figure 1:
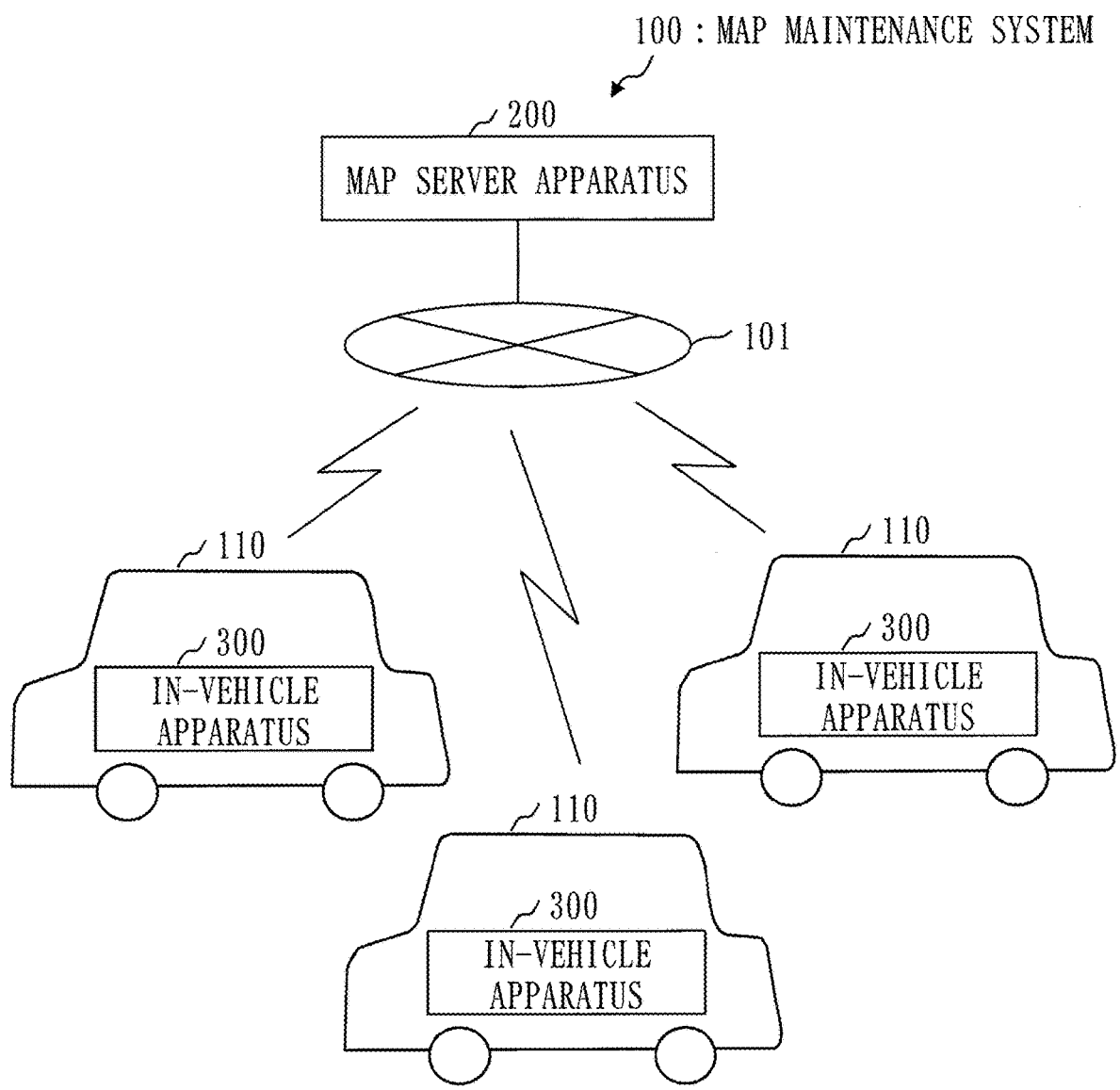
FIG. 1 is a configuration diagram of a map maintenance system 100 according to Embodiment 1.

Throughout the embodiments and drawings, the same elements and corresponding elements are denoted by the same reference numerals. A description of an element denoted by the same reference numeral will be appropriately omitted or simplified. An arrow in the drawings mainly indicates the flow of data or the flow of processing.

Embodiment 1

A map maintenance system 100 will be described with reference to FIGS. 1 to 11.

Description of Configuration

A configuration of the map maintenance system 100 will be described with reference to FIG. 1.

The map maintenance system 100 includes a map server apparatus 200 and in-vehicle apparatuses 300.

The map server apparatus 200 and the in-vehicle apparatus 300 of each cooperating vehicle 110 communicate with each other over a network 101. A specific example of the network 101 is the Internet.

The in-vehicle apparatus 300 is mounted on the cooperating vehicle 110.

The cooperating vehicle 110 is a vehicle having a function of measuring a road.

More specifically, the cooperating vehicle 110 is a transporting vehicle including various sensors for road measurement. The transporting vehicle is a vehicle for transporting at least either one of freight and passengers. The transporting vehicle is, for example, a taxi, a bus, or a home-delivery car.

The cooperating vehicle 110 corresponds to a measuring vehicle in a mobile mapping system (MMS).

The cooperating vehicle 110 performs road measurement while the cooperating vehicle 110 is running. If the cooperating vehicle 110 is a transporting vehicle, the cooperating vehicle 110 measures a road in a transport region during transport of at least either one of freight and passengers.

Figure 2:
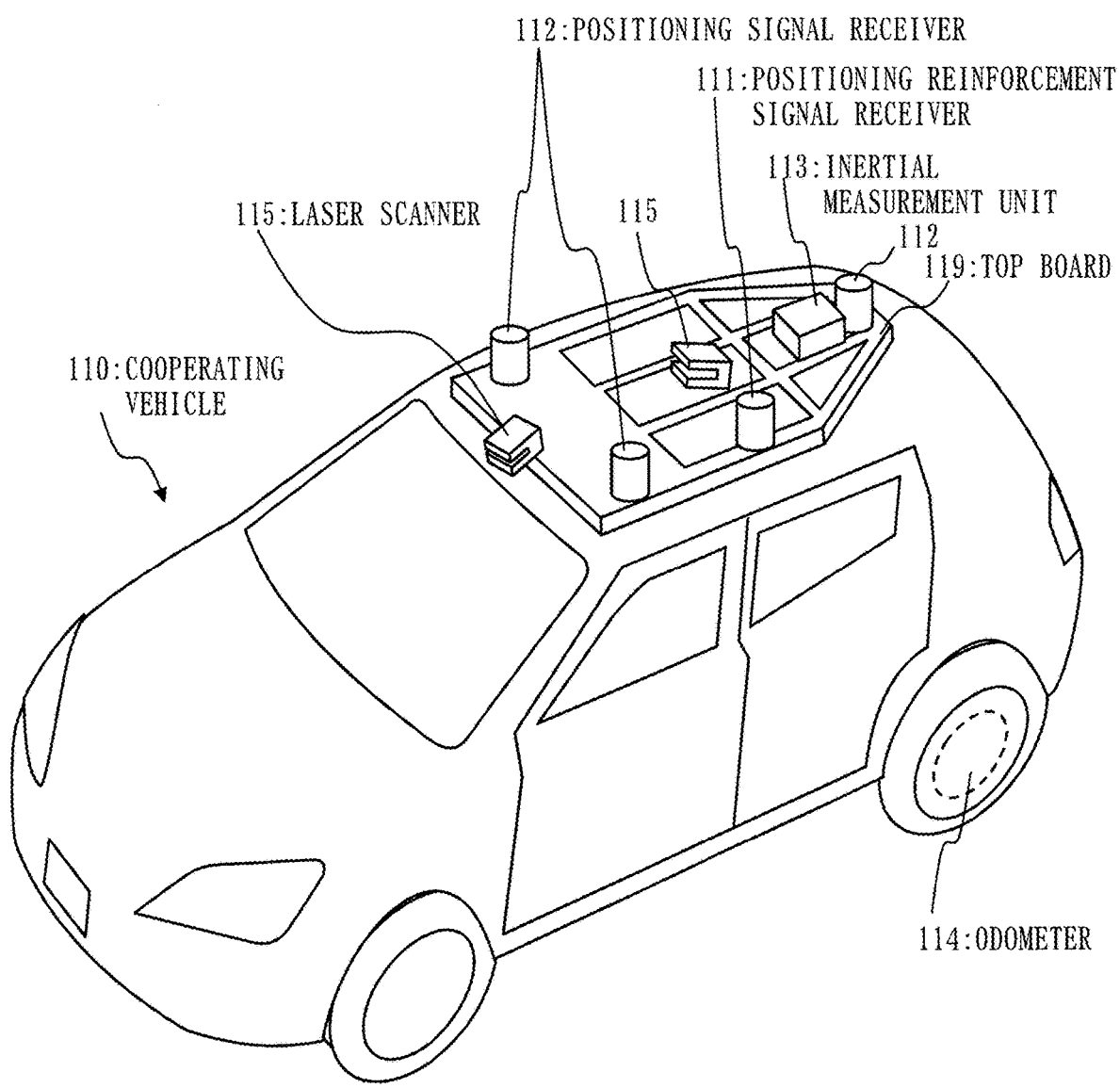
FIG. 2 is a configuration diagram of a cooperating vehicle 110 according to Embodiment 1.

A configuration example of the cooperating vehicle 110 will be described with reference to FIG. 2.

The cooperating vehicle 110 is provided with a top board 119. The top board 119 is provided on a roof of a vehicle body. The cooperating vehicle 110 also includes an odometer 114.

Various sensors are attached to the top board 119.

More specifically, a positioning reinforcement signal receiver 111, positioning signal receivers 112, an inertial measurement unit 113, and laser scanners 115 are attached to the top board 119.

The positioning reinforcement signal receiver 111 receives positioning reinforcement data from a GNSS satellite, or a terrestrial wireless LAN or mobile phone line. GNSS is an abbreviation for Global Navigation Satellite System.

Positioning reinforcement data has centimeter-level accuracy and is used to measure the position of the cooperating vehicle 110 with high accuracy.

Positioning reinforcement data is distributed from a GNSS satellite. Alternatively, positioning reinforcement data is distributed from a GNSS correction information distribution service provider over a mobile phone network.

If a GNSS satellite which is a quasi-zenith satellite distributes positioning reinforcement data, the positioning reinforcement data is included in an L6 band signal and indicates a satellite clock error of a GPS satellite, an orbit error of the GPS satellite, an inter-frequency bias, an error from an ionospheric propagation delay, and an error from a tropospheric delay. GPS stands for Global Positioning System.

The positioning signal receiver 112 receives a positioning signal transmitted from a positioning satellite and measures the position of the cooperating vehicle 110 using a result of receiving the positioning signal. Data obtained through positioning is called positioning data. An example of the positioning satellite is a GPS satellite.

The positioning data indicates the position of the cooperating vehicle 110 determined by the positioning signal receiver 112.

The inertial measurement unit 113 includes a gyroscope and an acceleration sensor. The gyroscope measures angles and angular velocities in three axial directions of the cooperating vehicle 110. The acceleration sensor measures accelerations in the three axial directions of the cooperating vehicle 110. The angles in the three axial directions indicate an elevation angle, a rotation angle, and an azimuth angle.

Data obtained by the inertial measurement unit 113 is called inertial measurement data.

The odometer 114 measures a running distance of the cooperating vehicle 110.

More specifically, the odometer 114 detects a vehicle speed pulse output each time a wheel of the cooperating vehicle 110 rotates, and calculates the running distance through integral computation using the rotating radius of a tire and the rotation amount of the wheel.

Data obtained by the odometer 114 is called running distance data.

The laser scanner 115 performs laser measurement.

In the laser measurement, the laser scanner 115 emits laser light while rotating a laser emission surface at a speed of about 100 revolutions per second. The laser scanner 115 then calculates a distance and an azimuth for each of spots which reflect the laser light. The spot that reflects the laser light is called a measuring point.

More specifically, the laser scanner 115 measures a time period from a laser light emission time to a laser light reception time, and calculates the distance to a measuring point using the measured time period. The emission time is a time of emission of laser light, and the reception time is a time of reception of the laser light reflected at the measuring point. The azimuth of the measuring point is an angle of the emission of the laser light.

Data obtained by the laser scanner 115 is called azimuth-distance data. The azimuth-distance data includes an azimuth and a distance for each measuring point.

Pieces of data obtained by the various sensors mounted on the cooperating vehicle 110 are each called measured data.

More specifically, positioning reinforcement data, positioning data, inertial measurement data, running distance data, and azimuth-distance data are collectively called measured data.

Figure 3:
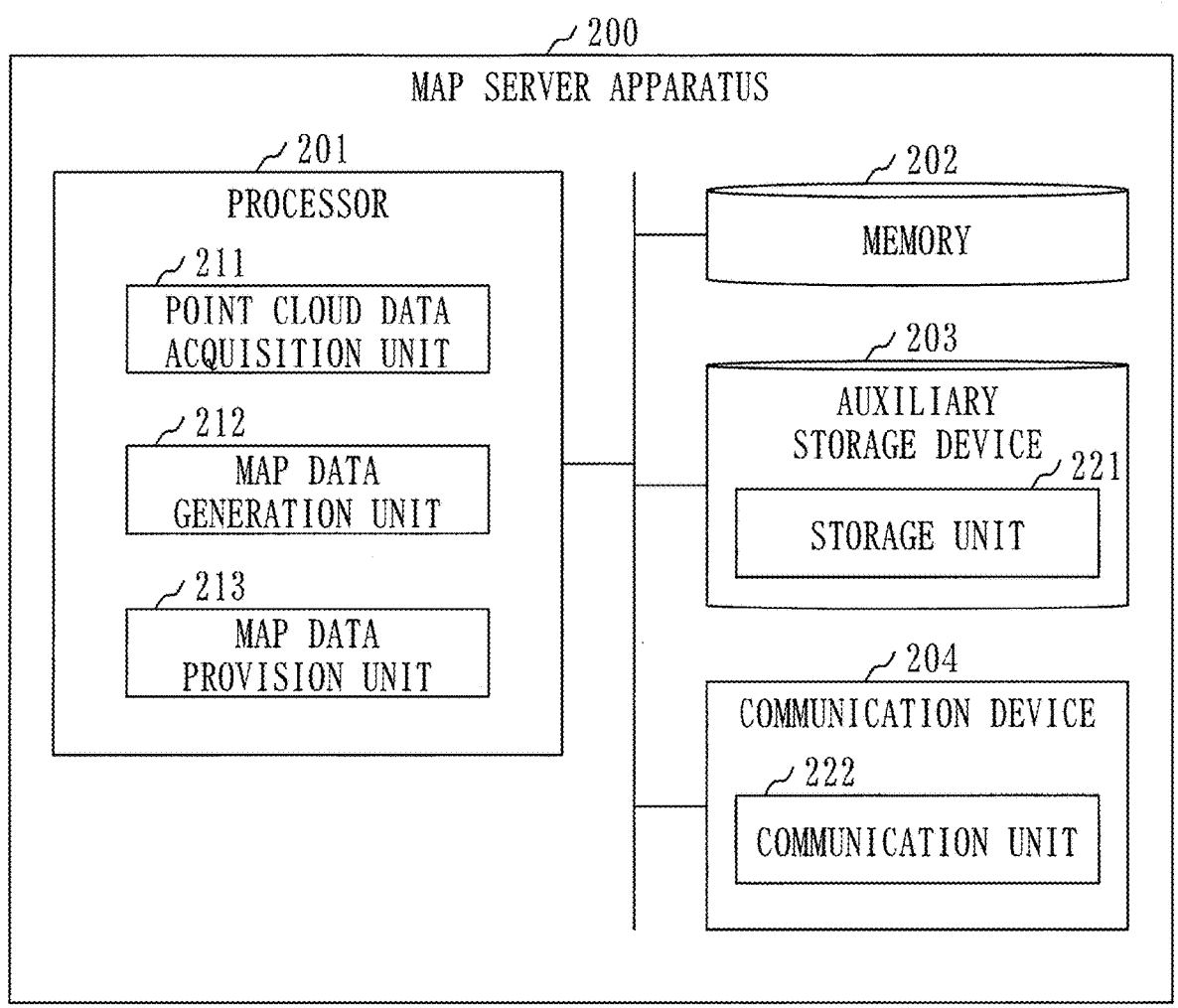
FIG. 3 is a configuration diagram of a map server apparatus 200 according to Embodiment 1.

A configuration of the map server apparatus 200 will be described with reference to FIG. 3.

The map server apparatus 200 is a computer including pieces of hardware, such as a processor 201, a memory 202, an auxiliary storage device 203, and a communication device 204. The pieces of hardware are connected to one another via signal lines.

The processor 201 is an IC (Integrated Circuit) which performs arithmetic processing and controls the other pieces of hardware. The processor 201 is, for example, a CPU (Central Processing Unit), a DSP (Digital Signal Processor), or a GPU (Graphics Processing Unit).

The memory 202 is a volatile storage device. The memory 202 is also called a main storage or a main memory. The memory 202 is, for example, a RAM (Random Access Memory). Data stored in the memory 202 is saved in the auxiliary storage device 203 as needed.

The auxiliary storage device 203 is a nonvolatile storage device. The auxiliary storage device 203 is, for example, a ROM (Read Only Memory), an HDD (Hard Disk Drive), or a flash memory. Data stored in the auxiliary storage device 203 is loaded into the memory 202 as needed.

The communication device 204 is a receiver and a transmitter. The communication device 204 is, for example, a communication chip or an NIC (Network Interface Card).

The map server apparatus 200 includes elements, such as a point cloud data acquisition unit 211, a map data generation unit 212, and a map data provision unit 213. The elements are implemented by software.

A map server program is stored in the auxiliary storage device 203, the map server program for causing a computer to function as the point cloud data acquisition unit 211, the map data generation unit 212, the map data provision unit 213, a storage unit 221, and a communication unit 222. The map server program is loaded into the memory 202 and is executed by the processor 201.

An OS (Operating System) is also stored in the auxiliary storage device 203. At least a part of the OS is loaded into the memory 202 and is executed by the processor 201.

That is, the processor 201 executes the map server program while executing the OS.

Data obtained through execution of the map server program is stored in a storage device, such as the memory 202, the auxiliary storage device 203, a register in the processor 201, or a cache memory in the processor 201.

The auxiliary storage device 203 functions as the storage unit 221. Note that any other storage device may function as the storage unit 221 instead of the auxiliary storage device 203 or together with the auxiliary storage device 203.

The communication device 204 functions as the communication unit 222.

The map server apparatus 200 may include a plurality of processors which substitute for the processor 201. The plurality of processors share the role of the processor 201.

The map server program can be computer-readably recorded (stored) in a nonvolatile recording medium, such as an optical disc or a flash memory.

Figure 4:
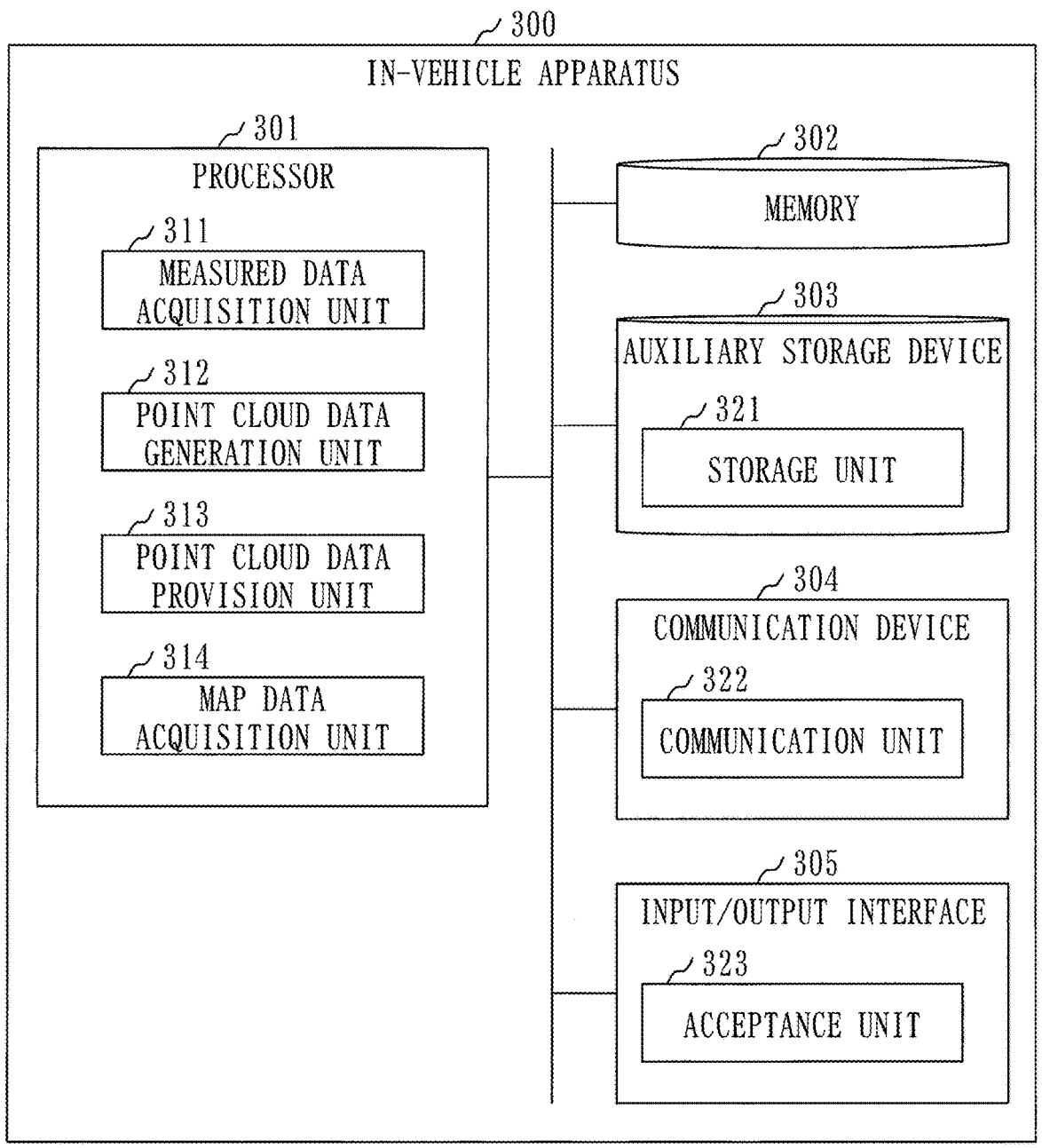
FIG. 4 is a configuration diagram of an in-vehicle apparatus 300 according to Embodiment 1.

A configuration of the in-vehicle apparatus 300 will be described with reference to FIG. 4.

The in-vehicle apparatus 300 is a computer which includes pieces of hardware, such as a processor 301, a memory 302, an auxiliary storage device 303, a communication device 304, and an input/output interface 305. The pieces of hardware are connected to one another via signal lines.

The processor 301 is an IC which performs arithmetic processing and controls the other pieces of hardware. The processor 301 is, for example, a CPU, a DSP, or a GPU.

The memory 302 is a volatile storage device. The memory 302 is also called a main storage or a main memory. The memory 302 is, for example, a RAM. Data stored in the memory 302 is saved in the auxiliary storage device 303 as needed.

The auxiliary storage device 303 is a nonvolatile storage device. The auxiliary storage device 303 is, for example, a ROM, an HDD, or a flash memory. Data stored in the auxiliary storage device 303 is loaded into the memory 302 as needed.

The communication device 304 is a receiver and a transmitter. The communication device 304 is, for example, a communication chip or an NIC.

The input/output interface 305 is a port through which data is input and output. The input/output interface 305 is, for example, a USB terminal. USB is an abbreviation for Universal Serial Bus.

The in-vehicle apparatus 300 includes elements, such as a measured data acquisition unit 311, a point cloud data generation unit 312, a point cloud data provision unit 313, and a map data acquisition unit 314. The elements are implemented by software.

An in-vehicle program is stored in the auxiliary storage device 303, the in-vehicle program for causing a computer to function as the measured data acquisition unit 311, the point cloud data generation unit 312, the point cloud data provision unit 313, the map data acquisition unit 314, a storage unit 321, a communication unit 322, and an acceptance unit 323. The in-vehicle program is loaded into the memory 302 and is executed by the processor 301.

An OS is also stored in the auxiliary storage device 303. At least a part of the OS is loaded into the memory 302 and is executed by the processor 301.

That is, the processor 301 executes the in-vehicle program while executing the OS.

Data obtained through execution of the in-vehicle program is stored in a storage device, such as the memory 302, the auxiliary storage device 303, a register in the processor 301, or a cache memory in the processor 301.

The auxiliary storage device 303 functions as the storage unit 321. Note that any other storage device may function as the storage unit 321 instead of the auxiliary storage device 303 or together with the auxiliary storage device 303.

The communication device 304 functions as the communication unit 322.

The input/output interface 305 functions as the acceptance unit 323.

The in-vehicle apparatus 300 may include a plurality of processors which substitute for the processor 301. The plurality of processors share the role of the processor 301.

The in-vehicle program can be computer-readably recorded (stored) in a nonvolatile recording medium, such as an optical disc or a flash memory.

Description of Operation

A map maintenance method by the map server apparatus 200 will be described with reference to FIG. 5.

In step S101, the point cloud data acquisition unit 211 acquires point cloud data from the in-vehicle apparatus 300 of the cooperating vehicle 110.

The point cloud data indicates respective three-dimensional coordinate values for measuring points.

More specifically, the in-vehicle apparatus 300 transmits the point cloud data to the map server apparatus 200. The point cloud data acquisition unit 211 receives the point cloud data transmitted from the in-vehicle apparatus 300 via the communication unit 222. The point cloud data acquisition unit 211 then stores the point cloud data in the storage unit 221.

In step S102, the map data generation unit 212 generates map data on the basis of the point cloud data.

The map data is data representing three-dimensional vectors (a linear shape) of a road.

More specifically, the map data generation unit 212 executes mapping software using the point cloud data as an input. With the execution, the map data is generated.

The mapping software is a program for generating map data on the basis of point cloud data.

In step S103, the map data provision unit 213 transmits the map data to the in-vehicle apparatus 300 that is a transmission source of measured data via the communication unit 222.

Figure 6:
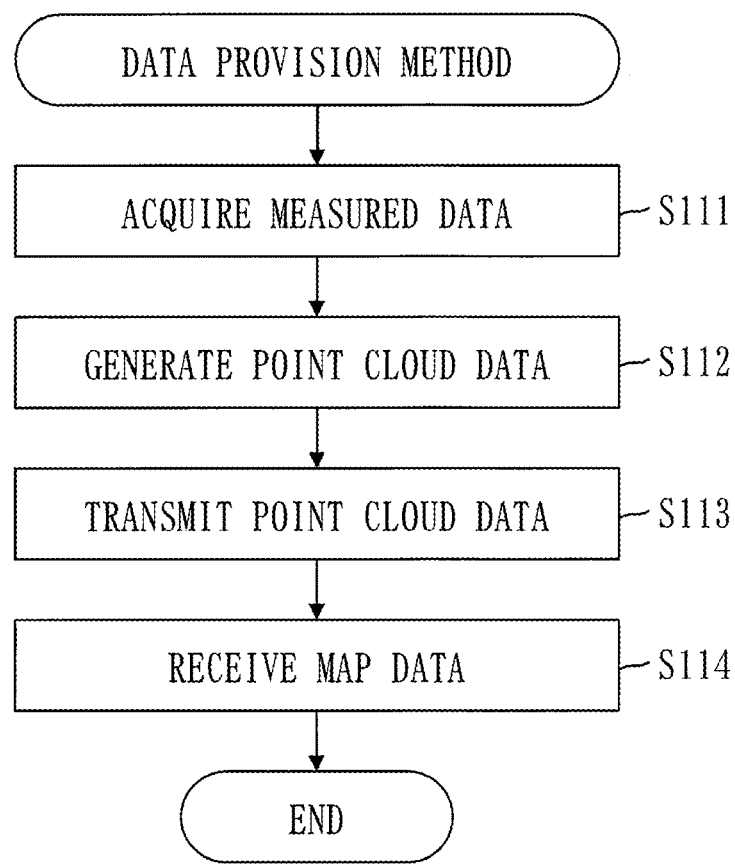
FIG. 6 is a flowchart of a data provision method by the in-vehicle apparatus 300 according to Embodiment 1.

A data provision method by the in-vehicle apparatus 300 will be described with reference to FIG. 6.

In step S111, the measured data acquisition unit 311 acquires pieces of measured data from the various sensors of the cooperating vehicle 110.

More specifically, when road measurement by the cooperating vehicle 110 is started, the various sensors output pieces of measured data. The output pieces of measured data are input to the in-vehicle apparatus 300. The acceptance unit 323 accepts the input pieces of measured data, and the measured data acquisition unit 311 acquires the pieces of measured data via the acceptance unit 323. The measured data acquisition unit 311 then stores the pieces of measured data in the storage unit 321.

In step S112, the point cloud data generation unit 312 generates point cloud data on the basis of the pieces of measured data.

A method of generating the point cloud data is the same as a method in a mobile mapping system.

In step S113, the point cloud data provision unit 313 transmits the point cloud data to the map server apparatus 200 via the communication unit 322.

In step S114, the map data acquisition unit 314 acquires map data from the map server apparatus 200.

More specifically, the map server apparatus 200 generates the map data on the basis of the point cloud data and transmits the map data to the in-vehicle apparatus 300. The map data acquisition unit 314 receives the map data transmitted from the map server apparatus 200 via the communication unit 322. The map data acquisition unit 314 then stores the map data in the storage unit 321.

Map data is data corresponding to static information of a dynamic map and is used for autonomous driving or navigation.

A map maintenance method by the map maintenance system 100 will be described with reference to FIG. 7.

In step S121, the in-vehicle apparatus 300 acquires pieces of measured data.

More specifically, when road measurement by the cooperating vehicle 110 is started, the various sensors output the pieces of measured data. The output pieces of measured data are input to the in-vehicle apparatus 300. The acceptance unit 323 accepts the input pieces of measured data, and the measured data acquisition unit 311 acquires the pieces of measured data via the acceptance unit 323. The storage unit 321 then stores the pieces of measured data.

In step S122, the in-vehicle apparatus 300 generates point cloud data.

More specifically, the point cloud data generation unit 312 generates the point cloud data on the basis of the pieces of measured data. The storage unit 321 then stores the point cloud data.

In step S123, the in-vehicle apparatus 300 transmits the point cloud data to the map server apparatus 200.

More specifically, the point cloud data provision unit 313 transmits the point cloud data to the map server apparatus 200 via the communication unit 322.

In step S124, the map server apparatus 200 stores the point cloud data.

More specifically, the point cloud data acquisition unit 211 receives the point cloud data via the communication unit 222. The storage unit 221 then stores the point cloud data.

In step S125, the map server apparatus 200 generates map data.

More specifically, the map data generation unit 212 executes the mapping software using the point cloud data as an input. With the execution, the map data is generated. The storage unit 221 stores the map data.

In step S126, the map server apparatus 200 transmits the map data to the in-vehicle apparatus 300.

More specifically, the map data provision unit 213 transmits the map data to the in-vehicle apparatus 300 that is a transmission source of measured data via the communication unit 222.

In step S127, the in-vehicle apparatus 300 stores the map data.

More specifically, the map data acquisition unit 314 receives the map data via the communication unit 322. The storage unit 321 then stores the map data.

Advantageous Effects of Embodiment 1

Measurement of roads throughout the country only with measuring vehicles owned by a measurement company is difficult, and it takes a long time to maintain dynamic maps.

In Embodiment 1, each cooperating vehicle 110 is equipped with various sensors (measuring functions). The cooperating vehicles 110 measure roads in regions. This makes it possible to maintain dynamic maps for more regions in a short time period.

Other Configurations

The in-vehicle apparatus 300 may provide measured data to the map server apparatus 200 instead of point cloud data.

Figure 8:
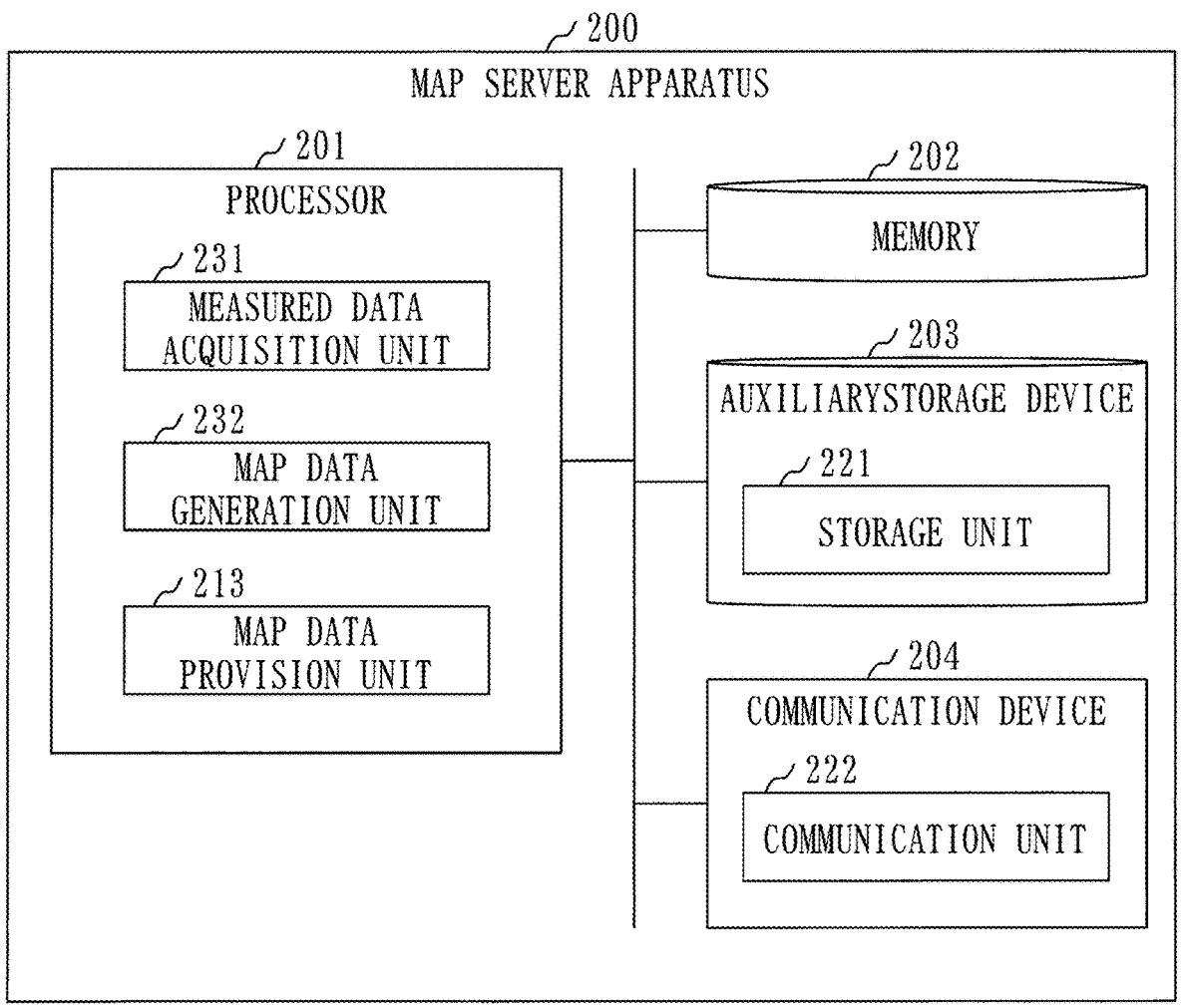
FIG. 8 illustrates a configuration example of the map server apparatus 200 according to Embodiment 1.

A configuration of the map server apparatus 200 will be described with reference to FIG. 8.

The map server apparatus 200 includes a measured data acquisition unit 231 and a map data generation unit 232 instead of the point cloud data acquisition unit 211 and the map data generation unit 212.

The measured data acquisition unit 231 acquires measured data from the in-vehicle apparatus 300. More specifically, the measured data acquisition unit 231 receives the measured data transmitted from the in-vehicle apparatus 300 via the communication unit 222.

The map data generation unit 232 generates map data on the basis of the measured data. More specifically, the map data generation unit 232 executes mapping software using the measured data as an input. With the execution, the map data is generated. The mapping software is a program for generating map data on the basis of the measured data. With the mapping software, point cloud data is generated on the basis of the measured data, and the map data is generated on the basis of the point cloud data.

Figure 9:
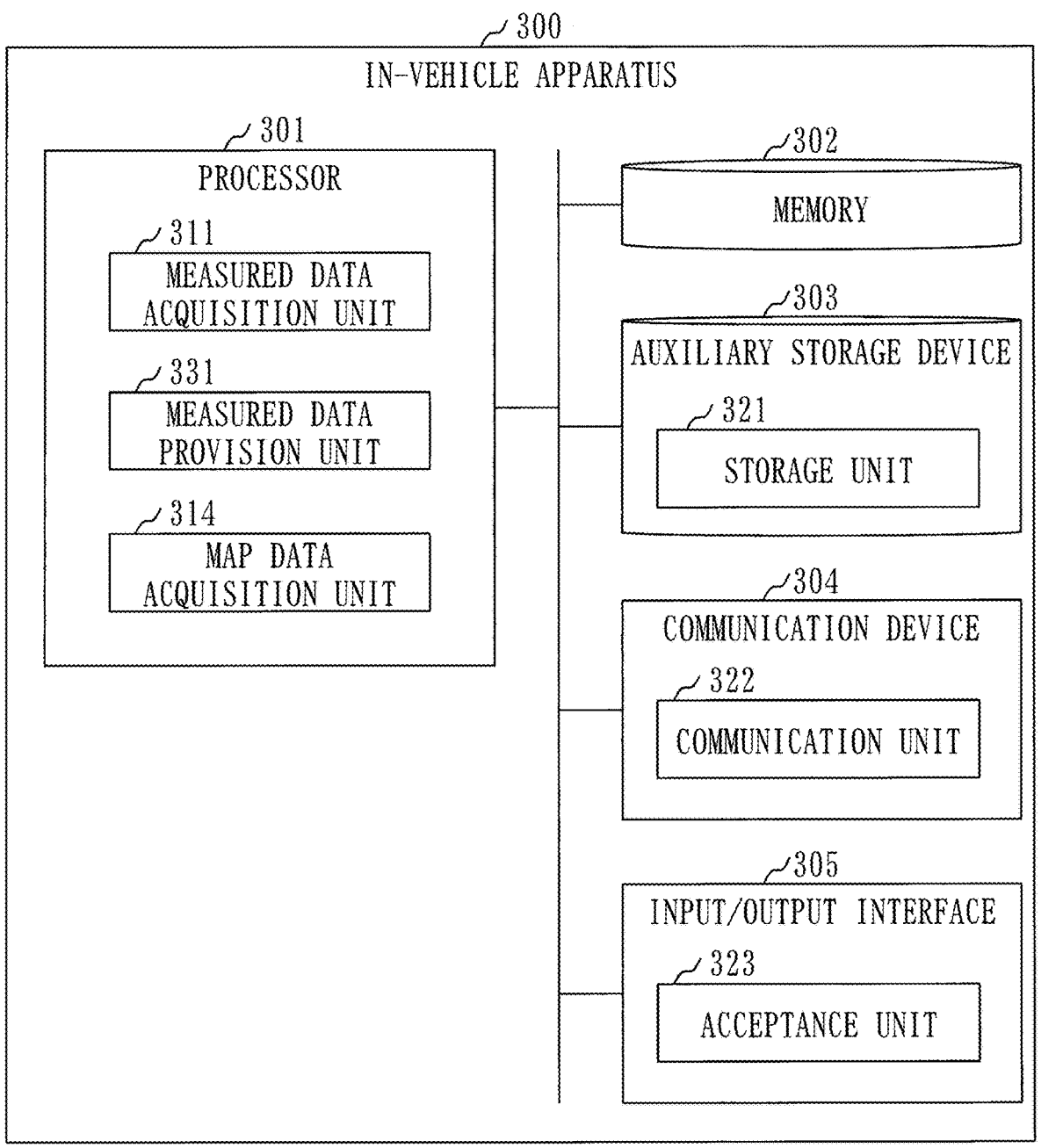
FIG. 9 illustrates a configuration example of the in-vehicle apparatus 300 according to Embodiment 1.

A configuration of the in-vehicle apparatus 300 will be described with reference to FIG. 9.

The in-vehicle apparatus 300 includes a measured data provision unit 331 instead of the point cloud data generation unit 312 and the point cloud data provision unit 313.

The measured data provision unit 331 transmits measured data to the map server apparatus 200 via the communication unit 322.

The in-vehicle apparatus 300 may provide map data to the map server apparatus 200 instead of point cloud data.

Figure 10:
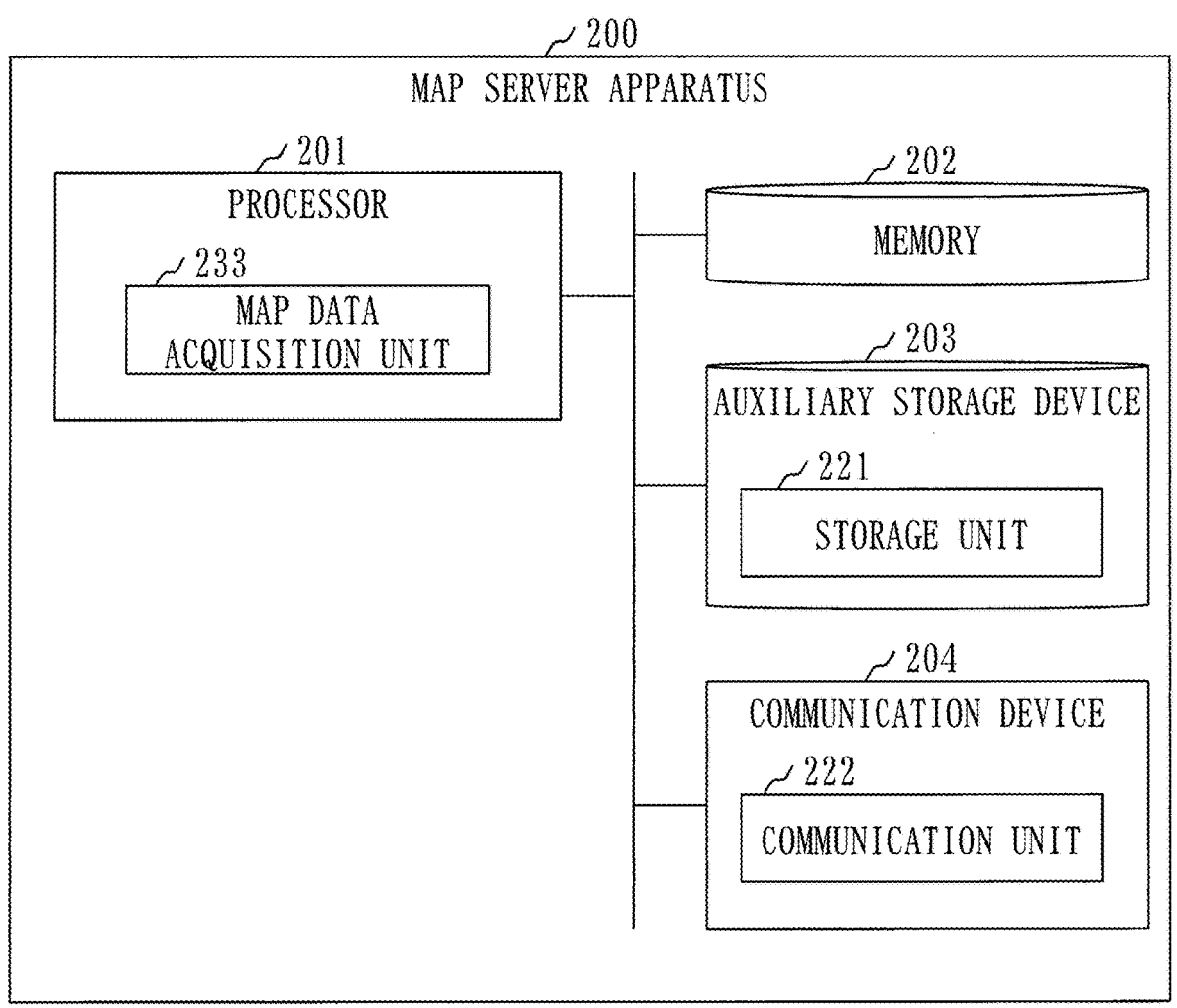
FIG. 10 illustrates a configuration example of the map server apparatus 200 according to Embodiment 1.

A configuration of the map server apparatus 200 will be described with reference to FIG. 10.

The map server apparatus 200 includes a map data acquisition unit 233 instead of the point cloud data acquisition unit 211, the map data generation unit 212, and the map data provision unit 213.

The map data acquisition unit 233 acquires map data from the in-vehicle apparatus 300. More specifically, the map data acquisition unit 233 receives the map data transmitted from the in-vehicle apparatus 300 via the communication unit 222.

Figure 11:
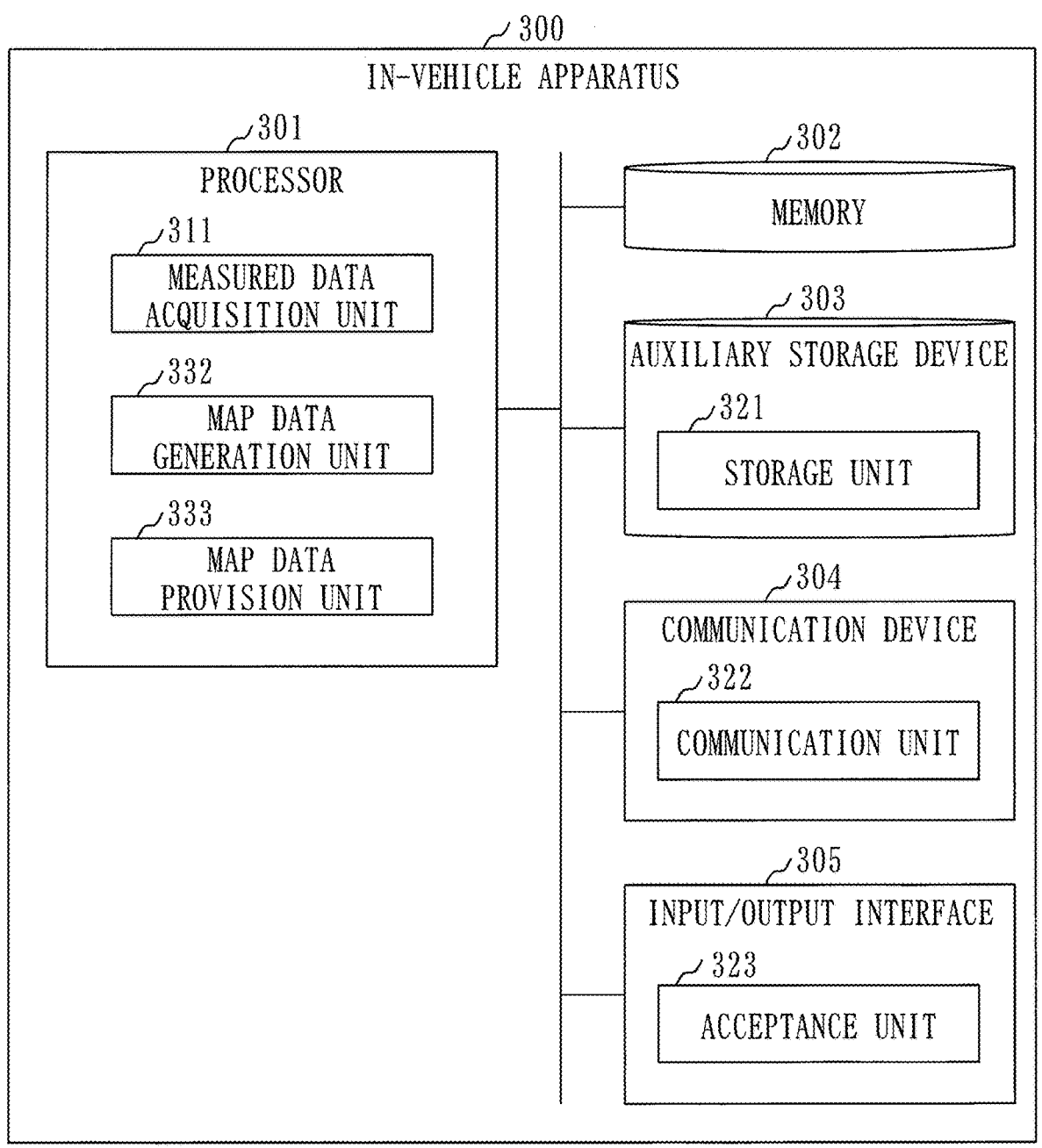
FIG. 11 illustrates a configuration example of the in-vehicle apparatus 300 according to Embodiment 1.

A configuration of the in-vehicle apparatus 300 will be described with reference to FIG. 11.

The in-vehicle apparatus 300 includes a map data generation unit 332 and a map data provision unit 333 instead of the point cloud data generation unit 312, the point cloud data provision unit 313, and the map data acquisition unit 314.

The map data generation unit 332 generates map data on the basis of measured data. More specifically, the map data generation unit 332 executes mapping software using the measured data as an input. With the execution, the map data is generated. The mapping software is a program for generating map data on the basis of measured data. With the mapping software, point cloud data is generated on the basis of the measured data, and the map data is generated on the basis of the point cloud data.

The map data provision unit 333 transmits the map data to the map server apparatus 200 via the communication unit 322.

Positioning evaluation data may be added to data (point cloud data, measured data, or map data) to be provided from the in-vehicle apparatus 300 to the map server apparatus 200.

The positioning evaluation data indicates a result of evaluating a positioning accuracy at the time of measurement.

The positioning evaluation data is generated on the basis of DOP (Dilution Of Precision), satellite arrangement information, or a fix/float error.

The DOP is a dilution of precision.

The satellite arrangement information indicates arrangement of a positioning satellite.

The fix/float error is an ambiguity error.

A map-related system may be present.

The map-related system relays point cloud data (or measured data) and map data between the map server apparatus 200 and the in-vehicle apparatus 300. The point cloud data (or measured data) and the map data are communicated via the map-related system.

The map-related system is, for example, a system used by a map company, a car company, a navigation system company, and the like. The map-related system is, for example, a system used by a logistics company, a taxi company, a bus company, a home-delivery company, and the like.

Encrypted point cloud data (or encrypted measured data) may be communicated.

That is, the in-vehicle apparatus 300 encrypts point cloud data (or measured data). The in-vehicle apparatus 300 then transmits the encrypted point cloud data (or encrypted measured data). The map server apparatus 200 receives the encrypted point cloud data (or encrypted measured data) and decodes the encrypted point cloud data (or encrypted measured data).

Embodiment 2

Figure 12:
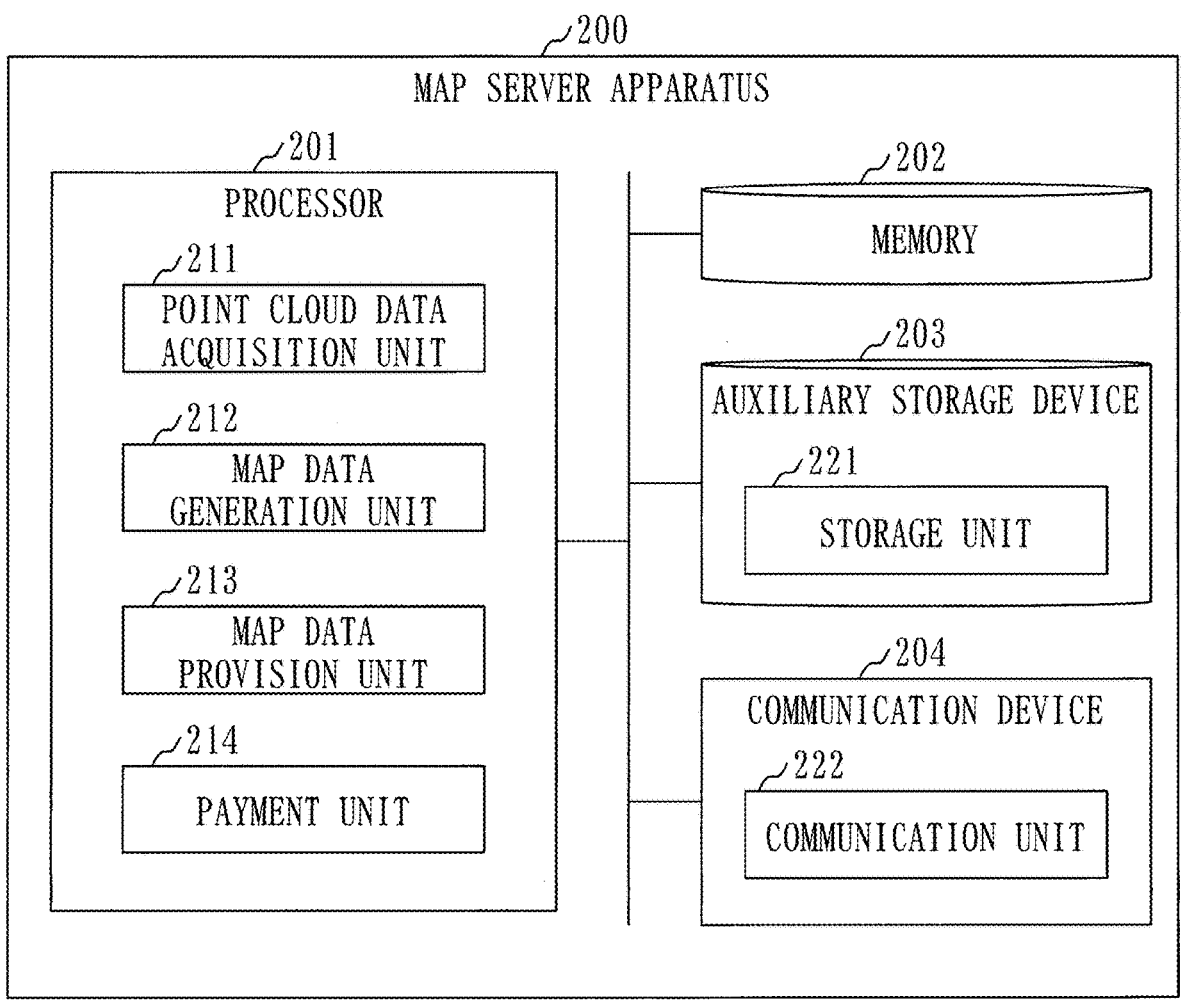
FIG. 12 is a configuration diagram of a map server apparatus 200 according to Embodiment 2.

A form of paying a price for data provision will be described with reference to FIGS. 12 to 14 mainly with a focus on differences from Embodiment 1.

Description of Configuration

A configuration of a map maintenance system 100 is the same as that (see FIG. 1) in Embodiment 1.

A configuration of a cooperating vehicle 110 is the same as that (see FIG. 2) in Embodiment 1.

A configuration of a map server apparatus 200 will be described with reference to FIG. 12.

The map server apparatus 200 further includes a payment unit 214.

A map server program further causes a computer to function as the payment unit 214.

A configuration of an in-vehicle apparatus 300 is the same as that (see FIG. 4) in Embodiment 1.

Description of Operation

A map maintenance method by the map server apparatus 200 will be described with reference to FIG. 13.

Figure 5:
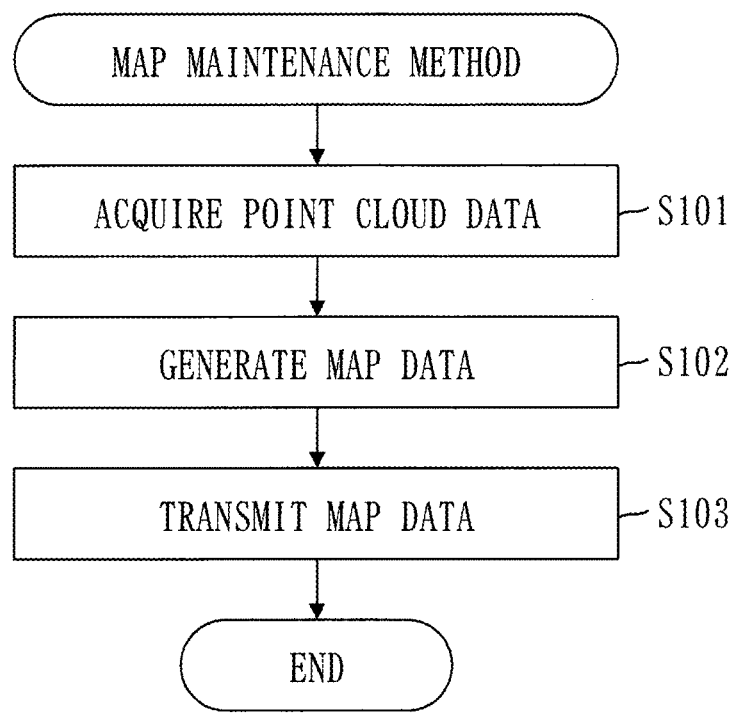
FIG. 5 is a flowchart of a map maintenance method by the map server apparatus 200 according to Embodiment 1.

Steps S201 to S203 are the same as steps S101 to S103 in Embodiment 1 (see FIG. 5).

In step S204, the payment unit 214 performs payment processing on a price for point cloud data acquired from the in-vehicle apparatus 300.

More specifically, the payment unit 214 pays the price for the point cloud data to a manager (owner or operator) of the cooperating vehicle 110. That is, the payment unit 214 pays the price for the point cloud data to a taxi company, a bus company, a transporting company, or the like. The payment is performed through electronic payment.

The payment unit 214 determines a price for point cloud data in the manner below.

(1) The payment unit 214 calculates the price on the basis of the number of measuring points included in the point cloud data. The larger the number of measuring points included in the point cloud data is, the higher the price is.

(2) The payment unit 214 calculates the price on the basis of the data quantity of map data generated on the basis of the point cloud data. The larger the data quantity of the generated map data is, the higher the price is. More specifically, the data quantity is the data size of the map data or the length of a road included in the map data.

(3) The payment unit 214 calculates the price on the basis of a running distance of the cooperating vehicle 110. The longer the running distance is, the higher the price is. The running distance may be calculated on the basis of the point cloud data or may be announced from the in-vehicle apparatus 300. More specifically, the running distance is the sum of distances between measuring points.

(4) The payment unit 214 calculates the price on the basis of a measurement time period of the cooperating vehicle 110. The measurement time period is a time period for road measurement performed by the cooperating vehicle 110. The longer the measurement time period is, the higher the price is. The measurement time period may be calculated on the basis of the point cloud data or may be announced from the in-vehicle apparatus 300. For example, in the point cloud data, a measurement time is associated with a three-dimensional coordinate value of each measuring point. The measurement time period is a time period from a first measurement time to a last measurement time.

A data provision method by the in-vehicle apparatus 300 is the same as that (see FIG. 6) in Embodiment 1.

A map maintenance method by the map maintenance system 100 will be described with reference to FIG. 14.

Figure 7:
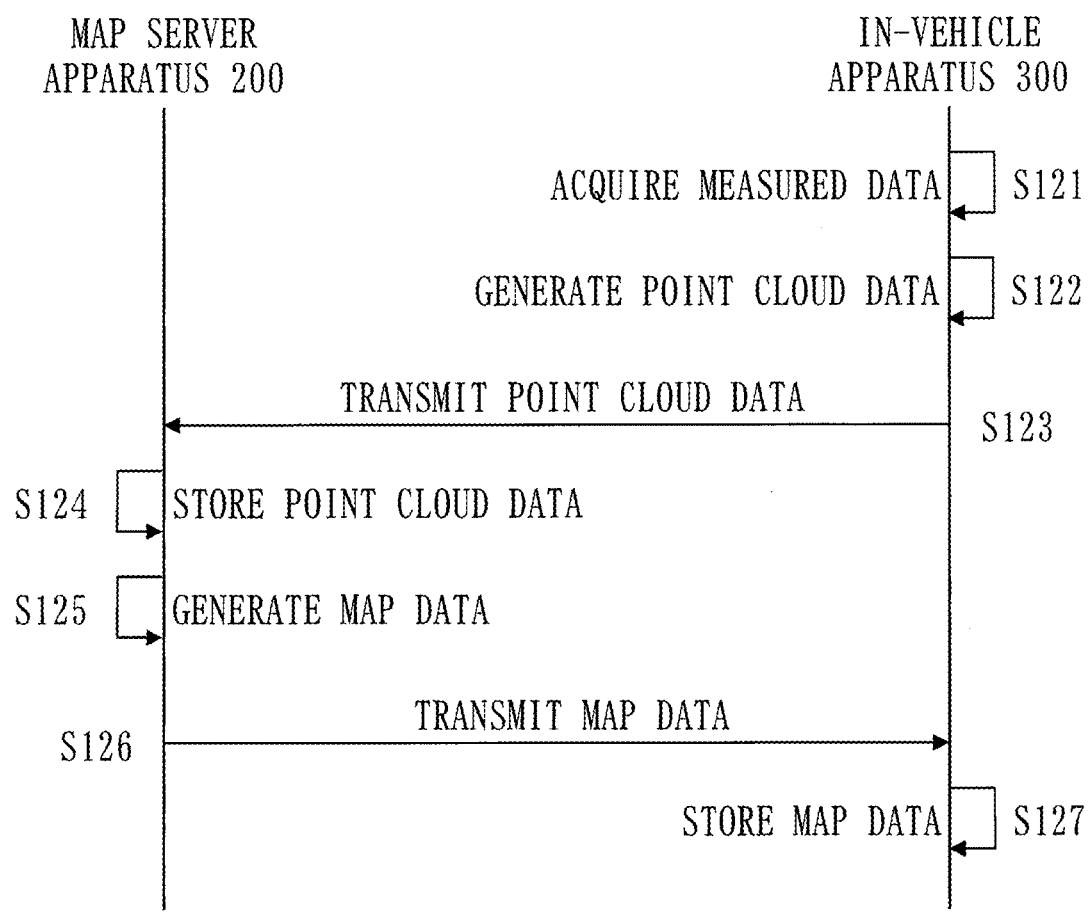
FIG. 7 is a flowchart of a map maintenance method by the map maintenance system 100 according to Embodiment 1.

Steps S221 to S227 are the same as steps S121 to S127 in Embodiment 1 (see FIG. 7).

In step S228, the map server apparatus 200 performs payment processing on point cloud data received from the in-vehicle apparatus 300.

Figure 13:
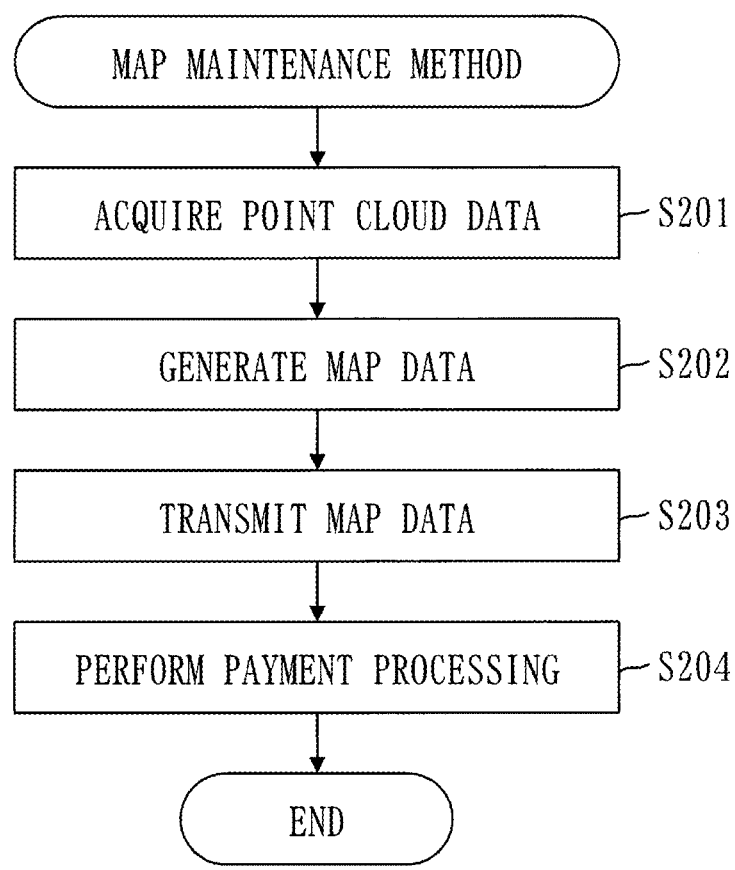
FIG. 13 is a flowchart of a map maintenance method by the map server apparatus 200 according to Embodiment 2.
Figure 14:
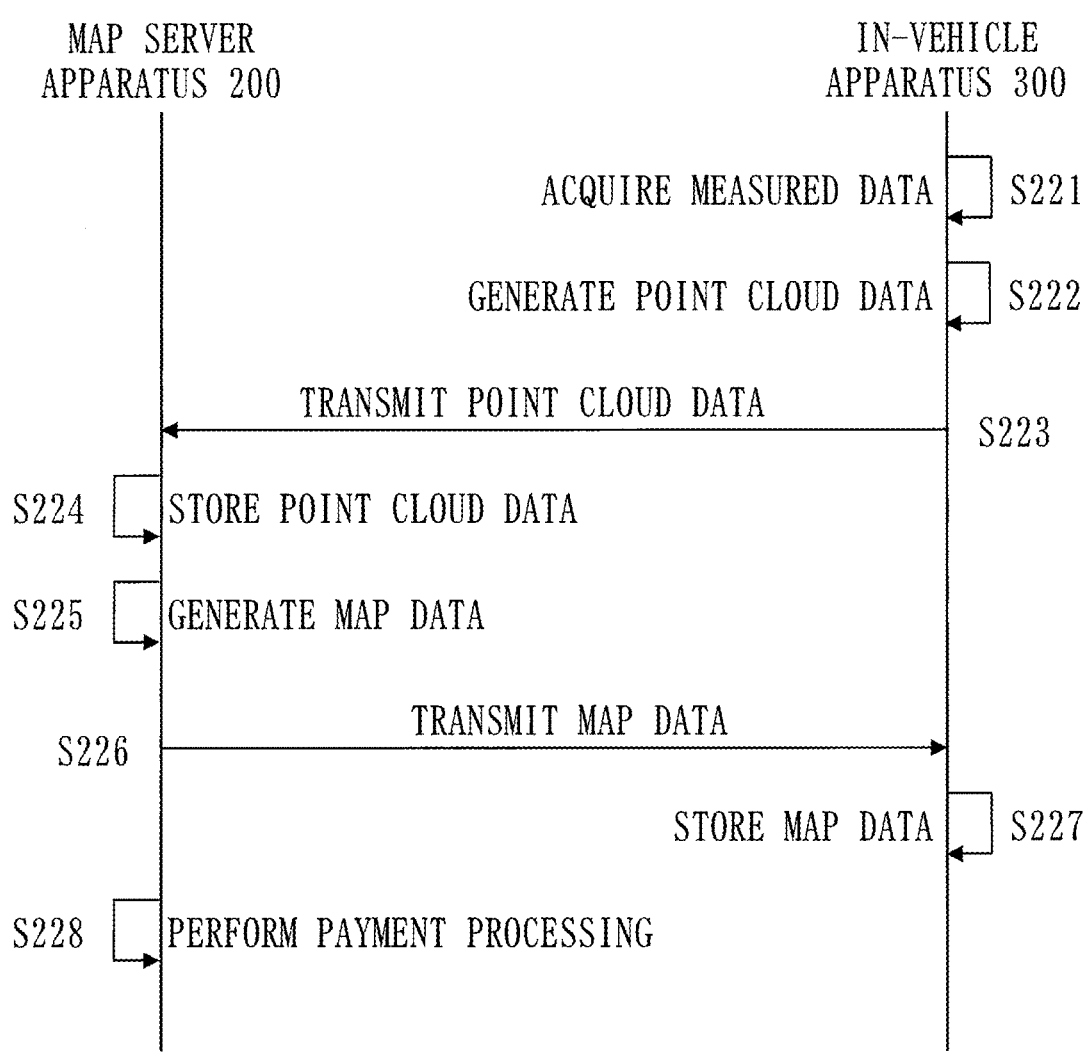
FIG. 14 is a flowchart of a map maintenance method by a map maintenance system 100 according to Embodiment 2.

The payment processing is as described in step S204 (see FIG. 13).

Advantageous Effects of Embodiment 2

Payment of a price for data provision allows facilitation of data provision. That is, road measurement by the cooperating vehicle 110 can be facilitated. This makes it possible to maintain dynamic maps for more regions in a short time period.

Other Configurations

As described at the end of Embodiment 1, the in-vehicle apparatus 300 may provide measured data or map data to the map server apparatus 200 instead of point cloud data (see FIGS. 8 to 11).

The payment unit 214 performs payment processing on data (measured data or map data) provided from the in-vehicle apparatus 300.

A data collection cooperator (data provider) manages the amount of a rate based on the data quantity of collected (and provided) data (a metered rate) or the amount of a rate based on a contract period (a flat rate).

For example, a data quantity in the metered rate is the quantity of vectors (pieces of road linear shape data), that is, the length of a mapped road. Alternatively, a data quantity in the metered rate is, for example, is the data quantity of pieces of point cloud data (a three-dimensional point cloud). For example, the amount of the flat rate is a monthly amount.

Embodiment 3

Figure 15:
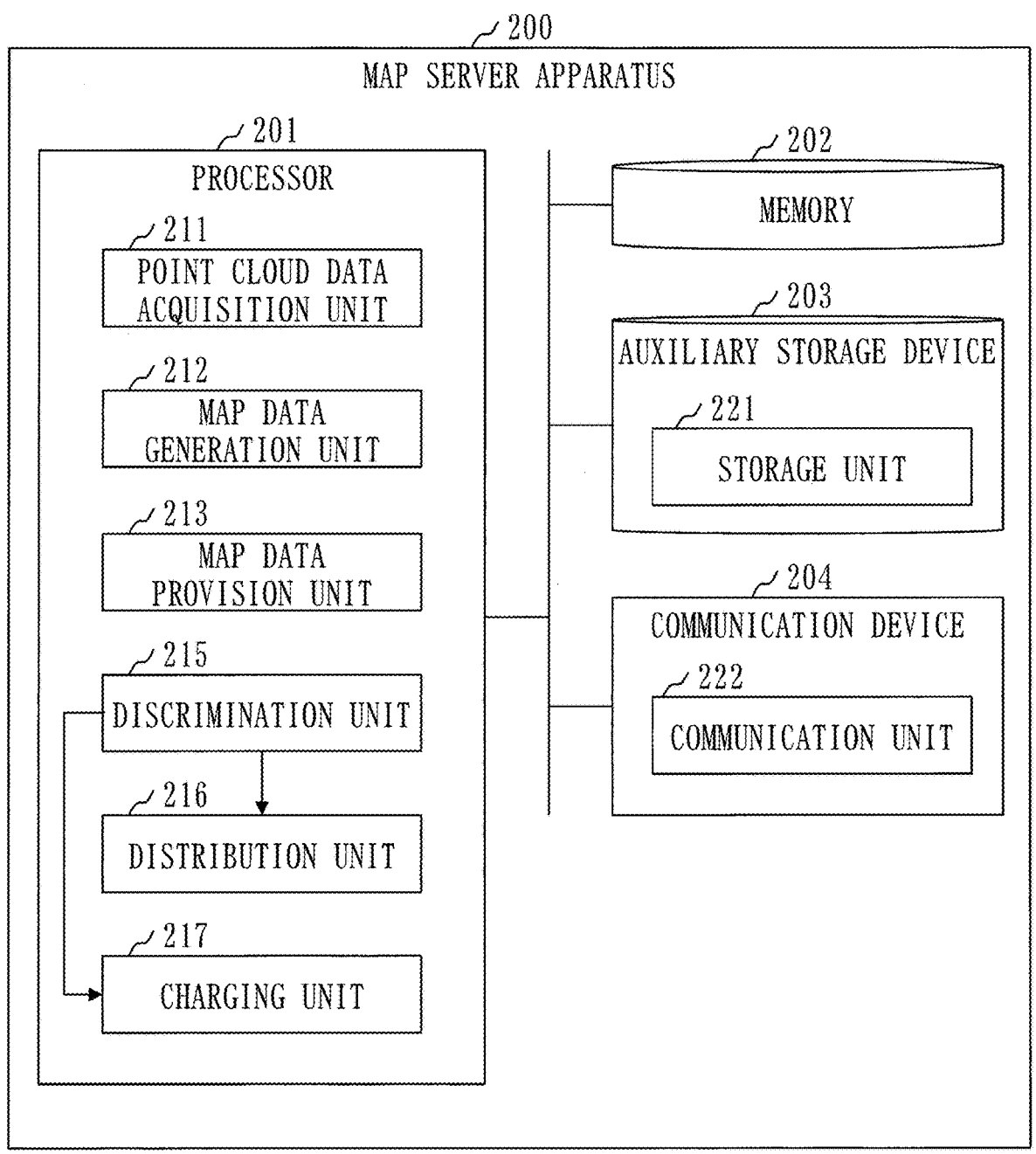
FIG. 15 is a configuration diagram of a map server apparatus 200 according to Embodiment 3.
Figure 16:
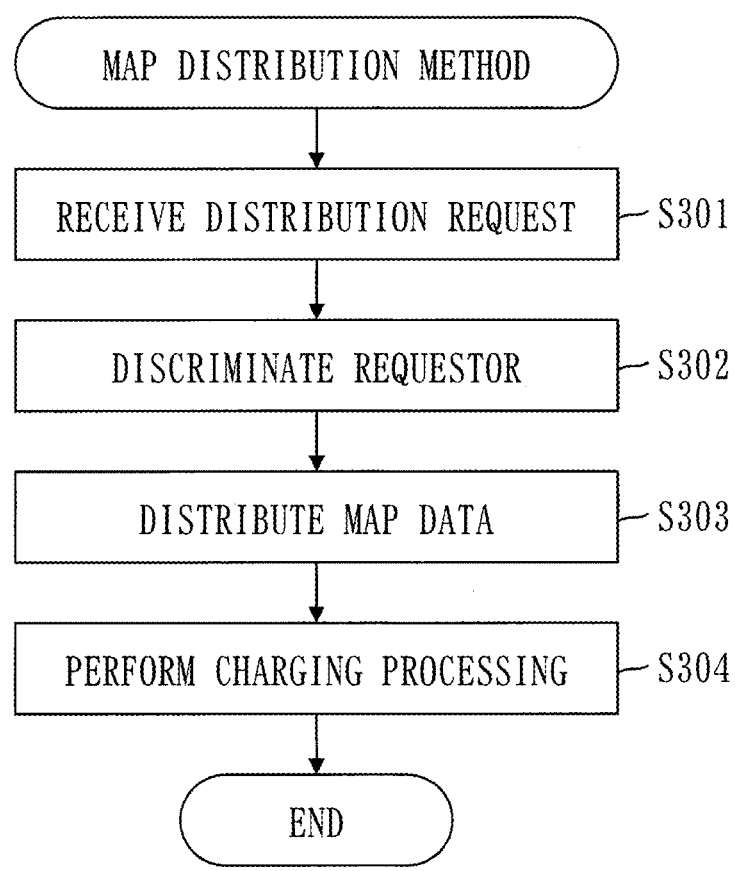
FIG. 16 is a flowchart of a map distribution method by the map server apparatus 200 according to Embodiment 3.

A form of giving preferential treatment to a data provider (cooperator) in map data distribution will be described with reference to FIGS. 15 and 16 mainly with a focus on differences from Embodiment 1.

Description of Configuration

A configuration of a map maintenance system 100 is the same as that (see FIG. 1) in Embodiment 1.

A configuration of a cooperating vehicle 110 is the same as that (see FIG. 2) in Embodiment 1.

A configuration of a map server apparatus 200 will be described with reference to FIG. 15.

The map server apparatus 200 further includes a discrimination unit 215, a distribution unit 216, and a charging unit 217.

A map server program further causes a computer to function as the discrimination unit 215, the distribution unit 216, and the charging unit 217.

A configuration of an in-vehicle apparatus 300 is the same as that (see FIG. 4) in Embodiment 1.

Description of Operation

A map distribution method by the map server apparatus 200 will be described with reference to FIG. 16.

An in-vehicle terminal mounted on a map-using car transmits a distribution request to the map server apparatus 200.

The map-using car is one of various vehicles which use map data. The map-using car may be the cooperating vehicle 110.

The distribution request is communication data for requesting distribution of map data.

In step S301, a communication unit 222 receives a distribution request.

In step S302, the discrimination unit 215 discriminates a manager of the map-using car. The manager of the map-using car is called a requestor.

More specifically, the discrimination unit 215 judges whether the requestor is a cooperator.

The cooperator is a manager of the cooperating vehicle 110. The cooperator is, for example, a taxi company, a bus company, or a transporting company.

The requestor is discriminated in the manner below.

The distribution request includes a manager identifier. The manager identifier is used to identify the manager of the map-using car.

A list of cooperators is stored in advance in a storage unit 221. The list of cooperators is a list of cooperator identifiers. Each cooperator identifier is used to identify a cooperator.

The discrimination unit 215 acquires the manager identifier from the distribution request and compares the manager identifier with the list of cooperators.

If the manager identifier is included in the list of cooperators, the discrimination unit 215 judges that the requestor is a cooperator.

If the manager identifier is not included in the list of cooperators, the discrimination unit 215 judges that the requestor is not a cooperator.

In step S303, the distribution unit 216 distributes map data.

More specifically, the distribution unit 216 selects map data requested by the distribution request from the storage unit 221. The distribution unit 216 then transmits the selected map data to an in-vehicle terminal which is a request source via the communication unit 222.

The distribution unit 216 determines a map data distribution method on the basis of a result of discriminating the requestor.

For example, the distribution unit 216 varies the map data distribution method in the manner below.

(1) The distribution unit 216 varies the quantity of information to be included in map data. If the requestor is a cooperator, the distribution unit 216 distributes map data including additional information. If the requestor is not a cooperator, the distribution unit 216 distributes map data without additional information. Additional information is, for example, dynamic information in a dynamic map. An example of dynamic information is road congestion information or signal information of a traffic signal.

(2) The distribution unit 216 varies the order of precedence in distribution. If the requestor is a cooperator, the distribution unit 216 distributes map data ahead of distribution for a distribution request from a requestor other than a cooperator. If the requestor is not a cooperator, map data is distributed later than distribution for a distribution request from a cooperator.

In step S304, the charging unit 217 performs charging processing on the distributed map data on the basis of the result of discriminating the requestor.

More specifically, the charging unit 217 determines a charge amount on the basis of the result of discriminating the requestor. A charge amount in a case where the requestor is a cooperator is lower than a charge amount in a case where the requestor is not a cooperator. If the requestor is not a cooperator, the charging unit 217 determines a regular rate as the charge amount. If the requestor is a cooperator, the charging unit 217 determines a reduced rate as the charge amount. The charging unit 217 then charges the requestor the determined charge amount. The charging is performed through electronic payment.

The charge amount in the case where the requestor is a cooperator may be zero. In this case, a cooperator need not be charged.

Advantageous Effects of Embodiment 3

Giving preferential treatment to a data provider (cooperator) in map data distribution allows facilitation of data provision. That is, road measurement by the cooperating vehicle 110 can be facilitated. This makes it possible to maintain dynamic maps for more regions in a short time period.

Other Configurations

If a requestor is a cooperator, the distribution unit 216 may vary a map data distribution method on the basis of at least any one of (1) the number of measuring points included in point cloud data, (2) the data quantity of map data generated on the basis of the point cloud data, (3) a running distance of the cooperating vehicle 110, and (4) a measurement time period of the cooperating vehicle 110.

If the requestor is a cooperator, the charging unit 217 may determine a charge amount on the basis of at least any one of (1) the number of measuring points included in point cloud data, (2) the data quantity of map data generated on the basis of the point cloud data, (3) the running distance of the cooperating vehicle 110, and (4) the measurement time period of the cooperating vehicle 110.

As described at the end of Embodiment 1, the in-vehicle apparatus 300 may provide measured data or map data to the map server apparatus 200 instead of point cloud data (see FIGS. 8 to 11).

As described in Embodiment 2, the map server apparatus 200 may include the payment unit 214.

Supplement to Embodiments

Figure 17:
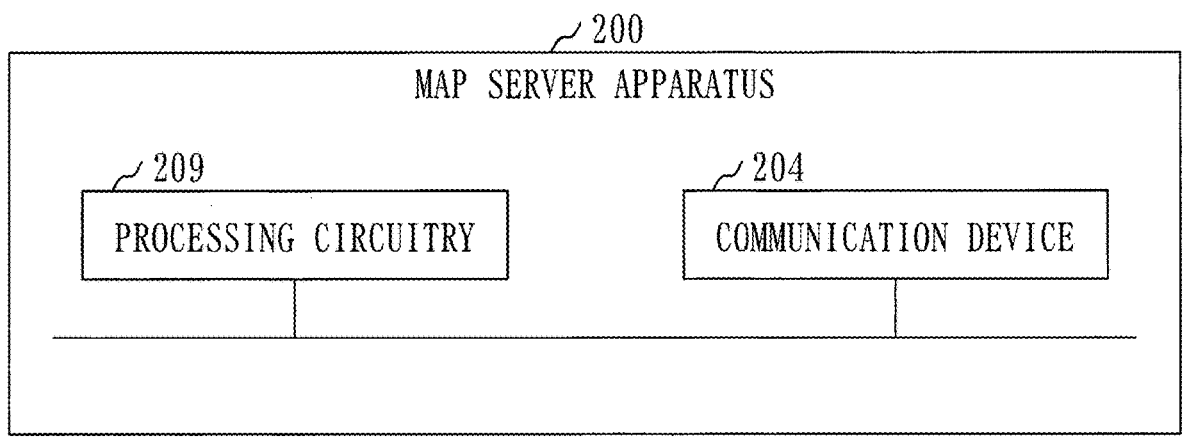
FIG. 17 is a hardware configuration diagram of the map server apparatus 200 according to each embodiment.

A hardware configuration of the map server apparatus 200 will be described with reference to FIG. 17.

The map server apparatus 200 includes processing circuitry 209.

The processing circuitry 209 is hardware which implements the point cloud data acquisition unit 211, the map data generation unit 212, the map data provision unit 213, the payment unit 214, the discrimination unit 215, the distribution unit 216, the charging unit 217, the measured data acquisition unit 231, the map data generation unit 232, and the map data acquisition unit 233.

The processing circuitry 209 may be dedicated hardware or the processor 201 that executes a program stored in the memory 202.

If the processing circuitry 209 is dedicated hardware, the processing circuitry 209 is, for example, a single circuit, a composite circuit, a programmed processor, a parallel-programmed processor, an ASIC, an FPGA, or a combination thereof.

ASIC is an abbreviation for Application Specific Integrated Circuit. FPGA is an abbreviation for Field Programmable Gate Array.

The map server apparatus 200 may include a plurality of processing circuits which substitute for the processing circuitry 209. The plurality of processing circuits share the role of the processing circuitry 209.

Some of the functions of the map server apparatus 200 may be implemented by dedicated hardware, and the others may be implemented by software or firmware.

As described above, the processing circuitry 209 can be implemented by hardware, software, firmware, or a combination thereof.

Figure 18:
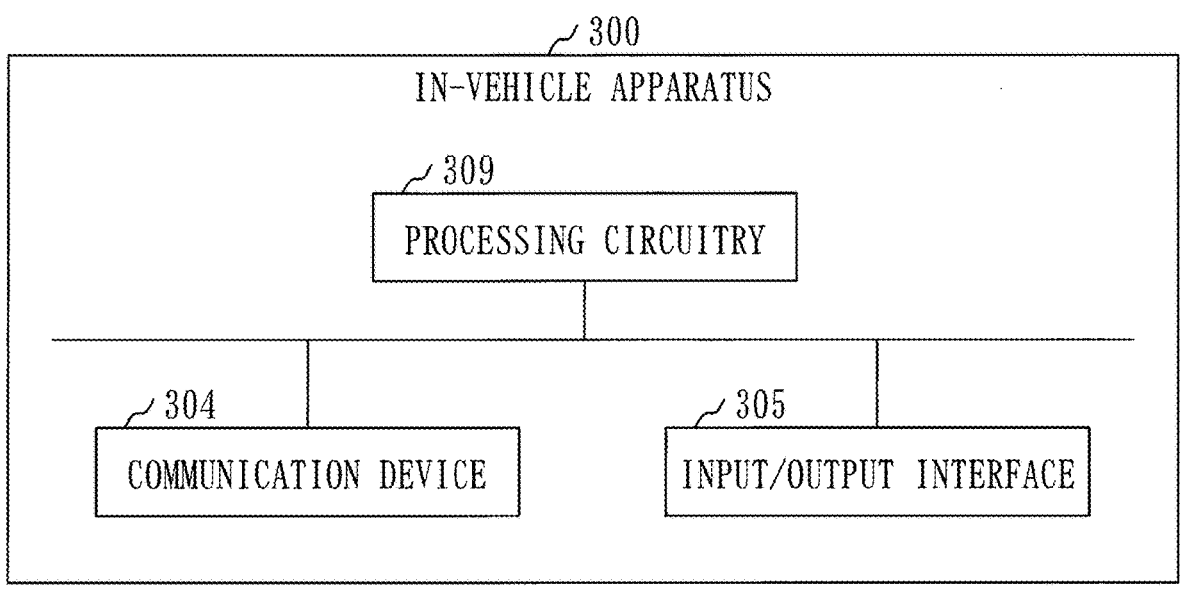
FIG. 18 is a hardware configuration diagram of the in-vehicle apparatus 300 according to each embodiment.

A hardware configuration of the in-vehicle apparatus 300 will be described with reference to FIG. 18.

The in-vehicle apparatus 300 includes processing circuitry 309.

The processing circuitry 309 is hardware which implements the measured data acquisition unit 311, the point cloud data generation unit 312, the point cloud data provision unit 313, the map data acquisition unit 314, the measured data provision unit 331, the map data generation unit 332, and the map data provision unit 333.

The processing circuitry 309 may be dedicated hardware or the processor 301 that executes a program stored in the memory 302.

If the processing circuitry 309 is dedicated hardware, the processing circuitry 309 is, for example, a single circuit, a composite circuit, a programmed processor, a parallel-programmed processor, an ASIC, an FPGA, or a combination thereof.

The in-vehicle apparatus 300 may include a plurality of processing circuits which substitute for the processing circuitry 309. The plurality of processing circuits share the role of the processing circuitry 309.

Some of the functions of the in-vehicle apparatus 300 may be implemented by dedicated hardware, and the others may be implemented by software or firmware.

As described above, the processing circuitry 309 can be implemented by hardware, software, firmware, or a combination thereof.

The embodiments are illustrative of preferred forms and are not intended to limit the technical scope of the present invention. The embodiments may be partly practiced or may be practiced in combination with another form. Each procedure described using a flowchart and the like may be appropriately changed.

REFERENCE SIGNS LIST

100: map maintenance system; 101: network; 110: cooperating vehicle; 111: positioning reinforcement signal receiver; 112: positioning signal receiver; 113: inertial measurement unit; 114: odometer; 115: laser scanner; 119: top board; 200: map server apparatus; 201: processor; 202: memory; 203: auxiliary storage device; 204: communication device; 209: processing circuitry; 211: point cloud data acquisition unit; 212: map data generation unit; 213: map data provision unit; 214: payment unit; 215: discrimination unit; 216: distribution unit; 217: charging unit; 221: storage unit; 222: communication unit; 231: measured data acquisition unit; 232: map data generation unit; 233: map data acquisition unit; 300: in-vehicle apparatus; 301: processor; 302: memory; 303: auxiliary storage device; 304: communication device; 305: input/output interface; 309: processing circuitry; 311: measured data acquisition unit; 312: point cloud data generation unit; 313: point cloud data provision unit; 314: map data acquisition unit; 321: storage unit; 322: communication unit; 323: acceptance unit; 331: measured data provision unit; 332: map data generation unit; 333: map data provision unit

The invention claimed is:

1. A map maintenance system, comprising:
a map server apparatus; and
an in-vehicle apparatus mounted on a cooperating vehicle, wherein
the map server apparatus includes
first processing circuitry configured to
receive, via a network, point cloud data from the in-vehicle apparatus,
generate, using mapping software, map data, based on the point cloud data, and update a dynamic map using the generated map data, and
determine a price for the point cloud data based on at least one of a number of measuring points included in the point cloud data, a data quantity of the map data, a running distance of the cooperating vehicle, and a measurement time period of the cooperating vehicle, and
perform payment processing of the determined price for the acquired point cloud data,
the in-vehicle apparatus includes
second processing circuitry configured to
acquire measured data obtained by the cooperating vehicle,
generate the point cloud data based on the measured data, and
transmit the point cloud data to the map server apparatus, and
the cooperating vehicle is a transporting vehicle, which includes sensors for road measurement.

2. A map maintenance system, comprising:
a map server apparatus; and
an in-vehicle apparatus mounted on a cooperating vehicle, wherein
the map server apparatus includes
first processing circuitry configured to
receive, via a network, point cloud data from the in-vehicle apparatus,
generate, using mapping software, map data, based on the point cloud data, and update a dynamic map using the generated map data,
receive a distribution request transmitted from an in-vehicle terminal mounted on a map-using car,
when the distribution request is received, distribute map data requested by the distribution request to the in-vehicle terminal of the map-using car,
when the distribution request is received, determine whether a manager of the map-using car is a manager of the cooperating vehicle, and
perform charging processing on the distributed map data based on a result of the determination as to whether the manager of the map-using car is the manager of the cooperating vehicle,
the in-vehicle apparatus of the cooperating vehicle includes
second processing circuitry of the cooperating vehicle configured to
acquire measured data obtained by the cooperating vehicle,
generate the point cloud data based on the measured data, and
transmit the point cloud data to the map server apparatus, and
the cooperating vehicle is a transporting vehicle, which includes sensors for road measurement.

3. The map maintenance system according to claim 2, wherein the first processing circuitry of the map server apparatus is further configured to determine a charge amount based on the result of the determination.

4. The map maintenance system according to claim 3, wherein the first processing circuitry of the map server apparatus is further configured to determine the charge amount based on at least one of a number of measuring points included in the point cloud data, a data quantity of the map data generated based on the point cloud data, a running distance of the cooperating vehicle, and a measurement time period of the cooperating vehicle, when the manager of the map-using car is the manager of the cooperating vehicle.

5. The map maintenance system according to claim 4, wherein the first processing circuitry of the map server apparatus is further configured to determine a distribution method for the map data based on the result of the determination.

6. The map maintenance system according to claim 5, wherein the first processing circuitry of the map server apparatus is further configured to determine at least either one of a quantity of information to be included in the map data and an order of precedence in distribution, based on the result of the determination.

7. The map maintenance system according to claim 6, wherein the first processing circuitry of the map server apparatus is further configured to determine the distribution method for the map data based on at least one of a number of measuring points included in the point cloud data, a data quantity of the map data generated based on the point cloud data, a running distance of the cooperating vehicle, and a measurement time period of the cooperating vehicle, when the manager of the map-using car is the manager of the cooperating vehicle.

8. The map maintenance system according to claim 3, wherein the first processing circuitry of the map server apparatus is further configured to determine a distribution method for the map data based on the result of the determination.

9. The map maintenance system according to claim 8, wherein the first processing circuitry of the map server apparatus is further configured to determine at least either one of a quantity of information to be included in the map data and an order of precedence in distribution, based on the result of the determination.

10. The map maintenance system according to claim 9, wherein the first processing circuitry of the map server apparatus is further configured to determine the distribution method for the map data based on at least one of a number of measuring points included in the point cloud data, a data quantity of the map data generated based on the point cloud data, a running distance of the cooperating vehicle, and a measurement time period of the cooperating vehicle, when the manager of the map-using car is the manager of the cooperating vehicle.

11. The map maintenance system according to claim 2, wherein the first processing circuitry of the map server apparatus is further configured to determine a distribution method for the map data based on the result of the determination.

12. The map maintenance system according to claim 11, wherein the first processing circuitry of the map server apparatus is further configured to determine at least either one of a quantity of information to be included in the map data and an order of precedence in distribution, based on the result of the determination.

13. The map maintenance system according to claim 12, wherein the first processing circuitry of the map server apparatus is further configured to determine the distribution method for the map data based on at least one of a number of measuring points included in the point cloud data, a data quantity of the map data generated based on the point cloud data, a running distance of the cooperating vehicle, and a measurement time period of the cooperating vehicle when the manager of the map-using car is the manager of the cooperating vehicle.

14. A map maintenance method, comprising:
- by an in-vehicle apparatus mounted on a cooperating vehicle, acquiring measured data obtained by the cooperating vehicle, generating point cloud data based on the measured data, and transmitting the point cloud data to a map server apparatus;
- by the map server apparatus, receiving, via a network, the point cloud data from the in-vehicle apparatus, generating using mapping software, map data, based on the point cloud data and, updating a dynamic map using the generated map data, determining a price for the point cloud data based on at least one of a number of measuring points included in the point cloud data, a data quantity of the map data, a running distance of the cooperating vehicle, and a measurement time period of the cooperating vehicle, and performing payment processing of the determined price for the received point cloud data, wherein the cooperating vehicle is a transporting vehicle which, includes sensors for road measurement.

15. A map maintenance method, comprising:
- by an in-vehicle apparatus mounted on a cooperating vehicle, acquiring measured data obtained by the cooperating vehicle, generating point cloud data based on the measured data, and transmitting the point cloud data to a map server apparatus; and
- by the map server apparatus, receiving, via a network, the point cloud data from the in-vehicle apparatus of the cooperating vehicle, generating, using mapping software, map data, based on the point cloud data, and updating a dynamic map using the generated map data, receiving a distribution request transmitted from an in-vehicle terminal mounted on a map-using car, distributing map data requested by the distribution request to the in-vehicle terminal of the map using car, determining whether a manager of the map-using car is a manager of the cooperating vehicle, and performing charging processing on the distributed map data based on a result of the determination as to whether the manager of the map-using car is the manager of the cooperating vehicle, wherein the cooperating vehicle is a transporting vehicle, which includes sensors for road measurement.

* * * * *